(12) United States Patent
Floch et al.

(10) Patent No.: US 10,244,429 B2
(45) Date of Patent: Mar. 26, 2019

(54) DATA DISSEMINATION IN A NAVIGATION OR COMMUNICATION SYSTEM

(71) Applicant: Airbus DS GmbH, Taufkirchen (DE)

(72) Inventors: Jean-Jacques Floch, Munich (DE); David Fernandez-Prim, Munich (DE); Thilo Fath, Munich (DE); Jan Wendel, Munich (DE)

(73) Assignee: AIRBUS DS GMBH, Taufkirchen (DE)

( * ) Notice: Subject to any disclaimer, the term of this patent is extended or adjusted under 35 U.S.C. 154(b) by 239 days.

(21) Appl. No.: 15/006,609

(22) Filed: Jan. 26, 2016

(65) Prior Publication Data

US 2016/0219586 A1    Jul. 28, 2016

(30) Foreign Application Priority Data

Jan. 27, 2015 (EP) .................................. 15000229

(51) Int. Cl.
*H04W 72/04* (2009.01)
*H04W 28/06* (2009.01)
(Continued)

(52) U.S. Cl.
CPC ........... *H04W 28/065* (2013.01); *G01S 19/02* (2013.01); *G01S 19/11* (2013.01); *H04W 72/04* (2013.01)

(58) Field of Classification Search
CPC ... H04W 28/065; H04W 28/02; H04W 72/04; H04B 1/00; G01S 19/02; G01S 19/11; H04N 5/455
See application file for complete search history.

(56) References Cited

U.S. PATENT DOCUMENTS 6,172,972 B1 * 1/2001 Birdwell ............ H04B 7/18584
370/349
7,805,661 B2 * 9/2010 Kim ...................... H04L 1/0041
714/758
(Continued)

FOREIGN PATENT DOCUMENTS

| EP | 1983770 A1 | 10/2008 |
| GB | 2339100 A | 1/2000 |
| WO | 2009135186 A2 | 11/2009 |

OTHER PUBLICATIONS

European Patent Office, European Search Report for European Patent Application No. 15000229.3 dated Jul. 24, 2015.

*Primary Examiner* — Lan-Huong Truong
(74) *Attorney, Agent, or Firm* — Lorenz & Kopf LLP (57) ABSTRACT

This relates to a method for disseminating data in a navigation or communication system comprising several transmitters for signals, wherein a common frame structure is provided for the signals and each transmitter disseminates common data and transmitter-dedicated data with its transmitted signal, and wherein the method comprises the following acts to be executed by each one of the transmitters: receiving the common data encoded with a first encoding scheme; encoding transmitter-dedicated data onboard the transmitter with a second encoding scheme; assigning the encoded common data to a number of first frames of the frame structure provided for the signals and assigning the encoded transmitter-dedicated data to a number of second frames of the frame structure provided for the signals, wherein the second frames differ from the first frames; assembling a signal to be transmitted from the number of first and second frames; and transmitting the assembled signal.

5 Claims, 6 Drawing Sheets

(51) Int. Cl.
*G01S 19/02* (2010.01)
*G01S 19/11* (2010.01)

(56) References Cited

U.S. PATENT DOCUMENTS

| | | |
|---|---|---|
| 9,070,236 B1* | 6/2015 | DiEsposti ............ G07C 5/0808 |
| 2006/0109808 A1* | 5/2006 | Ritter .................... H04H 20/02 |
| | | 370/315 |
| 2008/0227497 A1* | 9/2008 | Stirling-Gallacher ....................... |
| | | H04B 7/0617 |
| | | 455/562.1 |
| 2009/0034654 A1* | 2/2009 | Inukai .................. H04B 7/2125 |
| | | 375/299 |
| 2012/0128061 A1* | 5/2012 | Labrozzi ........ H04N 21/234354 |
| | | 375/240.02 |
| 2014/0327575 A1* | 11/2014 | Rao ........................ G01S 19/05 |
| | | 342/357.63 |
| 2015/0247928 A1* | 9/2015 | Waters ................... G01S 19/03 |
| | | 342/357.4 |

\* cited by examiner

DATA DISSEMINATION IN A NAVIGATION OR COMMUNICATION SYSTEM

CROSS-REFERENCE TO RELATED APPLICATION

This application claims priority to European Patent Application No. 15000229.3, filed Jan. 27, 2015, which is incorporated herein by reference in its entirety.

TECHNICAL FIELD

The embodiments described herein relate to improving data dissemination in a navigation system such as a GNSS (Global Navigation Satellite System) or an indoor navigation system or a communication system.

BACKGROUND

In addition, other objects, desirable features and characteristics will become apparent from the subsequent summary and detailed description, and the appended claims, taken in conjunction with the accompanying drawings and this background.

In communication systems, data dedicated to specific users and system common data are usually transmitted on two different channels. However, for some communication applications, common data and dedicated data may be transmitted on the same channel.

In navigation systems such as a GNSS like (NAVSTAR-) GPS (Global Positioning System) or the future European GNSS GALILEO, or in indoor navigation systems, a large amount of common data (such as global system information) as well as transmitter-dedicated data (onboard generated data) is sent to diverse user systems.

For example, to this regard the L5 navigation message transmitted by GPS satellites is encoded according to a ½ convolutional scheme and comprises frames with each frame being divided into five sub-frames. In the first three sub-frames, satellite specific data such as the status and health and the ephemeris data of the transmitting satellite are contained, while the fourth and fifth sub-frames comprise common system data such as almanac data of the GPS satellites, the difference between the GPS and UTC time, and data on the ionosphere. Thus, a GPS user system receives identical data transmitted by all satellites of a GNSS, but it cannot really take advantage of the same data transmitted in parallel as the common and transmitter-dependent L5 navigation data are encoded within the same stream and spread through the unique signatures assigned to each GPS satellite.

SUMMARY

It is an object of the present embodiment to improve the data dissemination in a navigation or communication system.

The embodiment proposes to separately encode the common data and the transmitter-dedicated data disseminated by different transmitters in a navigation or communication system, and then to assemble the two separately encoded data types in a common frame within the frame structure of the signals broadcasted in the navigation or communication system. The common data is data that is not entirely related to a specific transmitter, but to the navigation or communication system or a number of transmitters of the system. It typically comprises system information data common to several or all transmitters of the navigation or communication system, for example global navigation system data such as the satellite constellation state of a GNSS or communication control data of a communication system. The transmitter-dedicated data is data related to a specific transmitter. It typically comprises information data dedicated to a specific transmitter, for example the health status of the transmitter. Due to separation of encoding, the common data can already be encoded in a common station of the navigation or communication system and uplinked to the transmitters of the system, which do not need to encode the common data. Common data can be also divided into two or more subgroups, which are provided for transmission to different groups of transmitters. For example, one subgroup can contain common data to be broadcasted to all transmitters of the navigation or communication system, while another subgroup may contain common data which is transmitted to only some of the transmitters, for example common data provided for a regionally restricted application of the navigation or communication system can be assigned to a subgroup for transmission to satellites supplying the respective region with navigation or communication signals. The transmitter-dedicated data is usually encoded onboard of a transmitter.

An embodiment relates to a method for disseminating data in a navigation or communication system comprising several transmitters for signals, wherein a common frame structure is provided for the signals and each transmitter disseminates common data and transmitter-dedicated data through its broadcasted signal, and wherein the method comprises the following acts to be executed by each one of the transmitters: receiving the common data encoded with a first encoding scheme; encoding transmitter-dedicated data onboard the transmitter with a second encoding scheme, which may differ or not from the first encoding scheme; assigning the encoded common data to a number of first frames of the frame structure provided for the signals and assigning the encoded transmitter-dedicated data to a number of second frames of the frame structure provided for the signals, wherein the second frames differ from the first frames; assembling a signal to be transmitted from the number of first and second frames; and transmitting the assembled signal. In a navigation system, the transmitted signal may be a navigation signal, and in a communication system a communication signal between two communication devices.

The common data encoded with a first encoding scheme may be received from a common station of the navigation or communication system, which is configured to encode the common data with the first encoding scheme and to provide the encoded common data to the transmitters via uplink channels, and/or the common data may be encoded with a first encoding scheme onboard of the transmitter.

The acts of frame assignation may comprise applying a transmitter-dedicated assignment scheme or applying a common assignment scheme independent from a specific transmitter. In any case, a user receiver system must have knowledge of the frame assignation scheme in use.

A further embodiment relates to a computer program, which implements the method for disseminating data in a navigation or communication system comprising several transmitters for signals according to the embodiment and as described herein and enables the disseminating of data in a navigation or communication system according to the embodiment when executed by a computer, which is equipped with means for disseminating signals such as an antenna and a RF (Radio Frequency) front end.

According to a further embodiment, a record carrier storing a computer program according to the embodiment may be provided, for example a CD-ROM, a DVD, a memory card, a diskette, or a similar data carrier suitable to store the computer program for electronic access.

A yet further embodiment relates to a transmitter provided for disseminating a signal of a navigation or communication system, wherein a common frame structure is provided for the signals and the transmitter is configured to disseminate common data and transmitter-dedicated data with its transmitted signal, and wherein the transmitter comprises a receiver for receiving the common data encoded with a first encoding scheme; an encoder for encoding transmitter-dedicated data with a second encoding scheme, which may or may not differ from the first encoding scheme; a frame assigner for assigning the encoded common data to a number of first frames of the frame structure provided for the signals and for assigning the encoded transmitter-dedicated data to a number of second frames of the frame structure provided for the signals, wherein the second frames differ from the first frames; a signal assembler for assembling a signal to be transmitted from the number of first and second frames; and a signal transmitter for transmitting the assembled signal.

The frame assigner may be configured to perform the assignation according to an assignment scheme received from a common station of the navigation or communication system.

A further embodiment relates to a communications device, comprising a transmitter according to the embodiment and as described herein for disseminating a communication signal A yet further embodiment relates to a satellite, particularly a GNSS or Regional Augmentation satellite, comprising a transmitter according to the embodiment and as described herein for disseminating a navigation signal, particularly a GNSS or Regional Augmenation navigation signal.

A yet further embodiment relates to a pseudolite station of an indoor navigation system comprising a transmitter according to the embodiment and as described herein for disseminating an indoor navigation signal.

A yet further embodiment relates to a receiver for receiving a signal disseminated by a transmitter according to the invention and as described herein, wherein the receiver comprises a Correlation, Integration & Dump unit for extracting symbols from the received signal, a Delay-Locked Loop comprising a Code discriminator, a Code Loop filter, and a Code Numerically Controlled Oscillator, a Phase-Locked Loop comprising a Carrier discriminator, a Carrier Loop filter, and a Carrier Numerically Controlled Oscillator, a Carrier Wipe-off unit for down-converting the received signal into baseband, a Code generator controlled by the Code Numerically Controlled Oscillator and providing codes for the Correlation, Integration & Dump unit for the symbols extraction, and a first symbol processing unit for processing a chain of extracted symbols by applying a first mask for extracting system symbols containing common data, summing the extracted system symbols and decoding the summed extracted system symbols in order to obtain the common data, and a second symbol processing unit for processing the chain of extracted symbols by applying a second mask for extracting transmitter-dedicated symbols containing transmitter-dedicated data, and decoding the extracted transmitter-dedicated symbols in order to obtain the transmitter-dedicated data.

The receiver may be configured for receiving a navigation signal or a communication signal disseminated by a transmitter according to the embodiment and as described herein.

The first and second symbol processing units may be configured to select the first and second masks depending on a frame assignment scheme applied by the transmitter of the signal for assigning encoded common data to a number of first frames of a frame structure provided for the signal and assigning encoded transmitter-dedicated data to a number of second frames of the frame structure provided for the signal.

The symbol processing units may be further configured to combine data contained in the number of first frames received from multiple transmitters. This combination of the multiple received common data replicas can provide a diversity gain, and thus can improve receiver performance.

A yet further embodiment relates to a user navigation or communication device comprising a receiver according to the embodiment and as described herein and a processor being configured to process transmitter-dedicated data and common data output by the receiver.

These and other aspects will be apparent from and elucidated with reference to the embodiments described hereinafter.

The embodiment will be described in more detail hereinafter with reference to exemplary embodiments. However, the embodiment is not limited hereto.

BRIEF DESCRIPTION OF DRAWINGS

The various embodiments will hereinafter be described in conjunction with the following drawing figures, wherein like numerals denote like elements, and.

DETAILED DESCRIPTION

The following detailed description is merely exemplary in nature and is not intended to limit the disclosed embodiments or the application and uses thereof. Furthermore, there is no intention to be bound by any theory presented in the preceding background detailed description.

In the following, functionally similar or identical elements may have the same reference numerals. Absolute values are shown below by way of example only and should not be construed as limiting.

In the following, embodiments are described with regard to a GNSS such as GPS or Galileo, but it should be noted that the present embodiment is not restricted to an application with a GNSS and is also well suited for application with any kind of navigation and/or communication system, such as pseudolite indoor navigation systems as the environment in this case is often more stringent and broadcasted data are crucial in order to obtain the location of the transmitters.

The embodiment proposes to encode separately common data transmitted by the system (e.g. GPS satellite constellation) and the transmitter-dedicated data. Both encoded data are then assembled.

Figure 1:
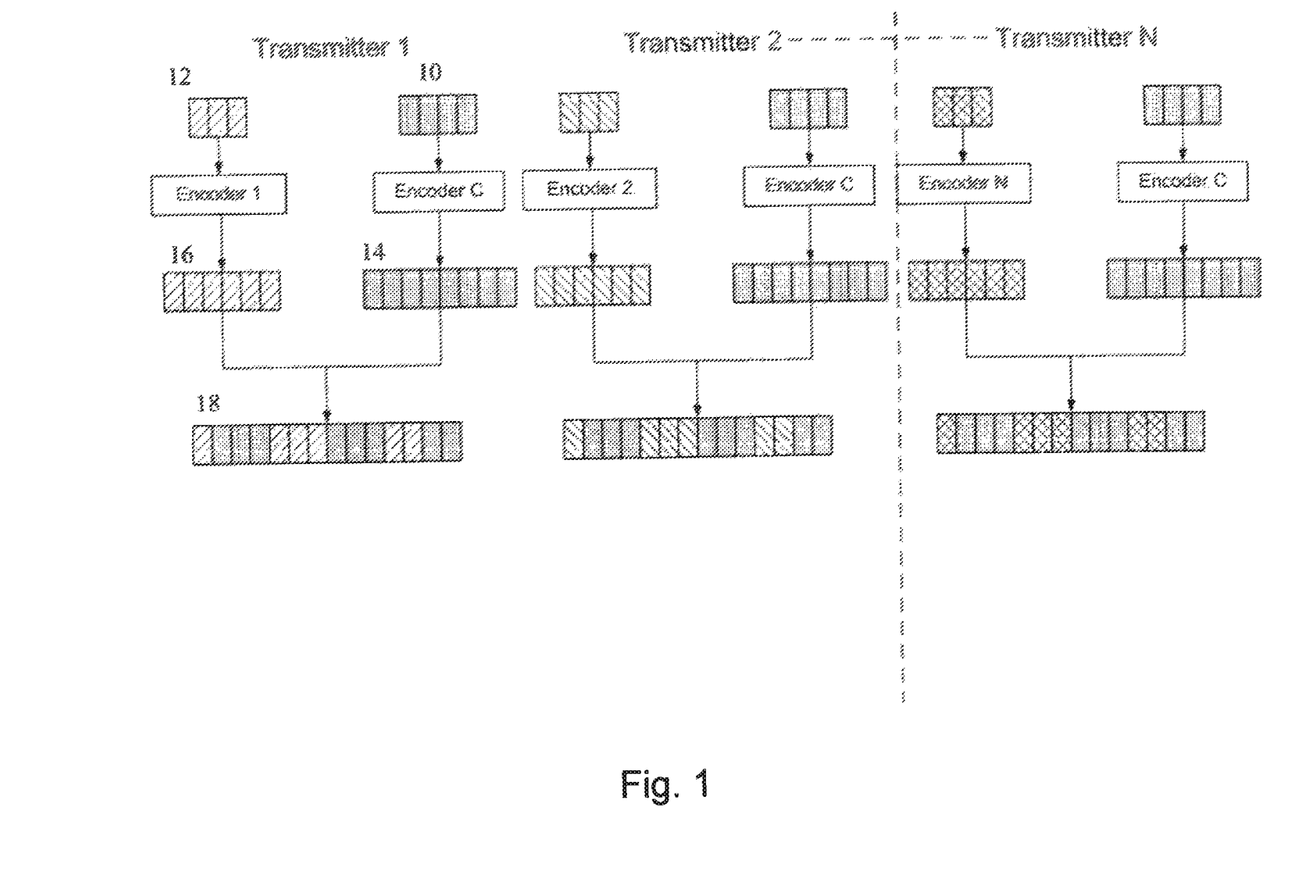
FIG. 1 shows the principle of separately encoding common data and transmitter-dedicated data and of assembling the separately encoded data in a common frame structure of a navigation or communication system on the transmitter side according to an embodiment.

FIG. 1 shows the principle underlying the present embodiment: each transmitter 1 . . . N (satellite or communication signal transmitter station such as a mobile base station of a mobile communication system) is configured to transmit two types of data, its own information data 12 (dedicated data for each transmitter e.g. transmitter health status) and data 10, which is common to some or all transmitters 1 . . . N of the constellation, particularly system information data.

These two types of data are encoded separately. The transmitter-dedicated data 12 can be encoded onboard of the transmitter. Thus, as shown in FIG. 1, a dedicated encoder 1 . . . N is assigned to each of the transmitters 1 . . . N for encoding the transmitter-dedicated data 12. The system information data 10 can already be encoded in a common station with an encoder C and uplinked to each transmitter. The system information data 10 can also be encoded onboard of each transmitter by an encoder. The system information data 10 are encoded with a first encoding scheme, and the transmitter-dedicated data 12 with a second encoding scheme. The first and second encoding schemes may or may not differ. For example, the first encoding scheme may be selected in order to meet certain bandwidth limitations of uplink channels to transmitters, while the second encoding scheme may be selected to meet processing power available onboard a transmitter. System information or common data can even be divided into two groups of data, data which are transmitted by the full constellation or only by a subgroup of the constellation (e.g. regional application). The encoding of the system information data (for the full or subgroups of the transmitter constellation) being done by a common station reduces the processing load of each transmitter.

As shown in FIG. 1, the system information data 10 and the transmitter-dedicated data 12 are rationally gathered in each transmitter 1 . . . N and assigned to an assembled frame structure of the navigation/communication signals after encoding: the encoded common system information data 10 is assigned to a number of first frames 14, and the encoded transmitter-dedicated data 12 is assigned to a number of second frames 16. The first and second frames 14, 16 belong to a frame structure 18, which determines the distribution of the first and second frames within the frame structure 18 and the assignment of the encoded data 10 and 12 to the frames of the frame structure 18.

The position of the encoded common data and transmitter-dedicated data within the frame structure 18 (assignment scheme) needs to be known by receivers of the signal. The assignment scheme can be transmitter-dependent or transmitter-independent. If it is transmitter-independent, it will allow using a single mask for all receiver chains to distinguish common data and transmitter-dedicated data.

Figure 2:
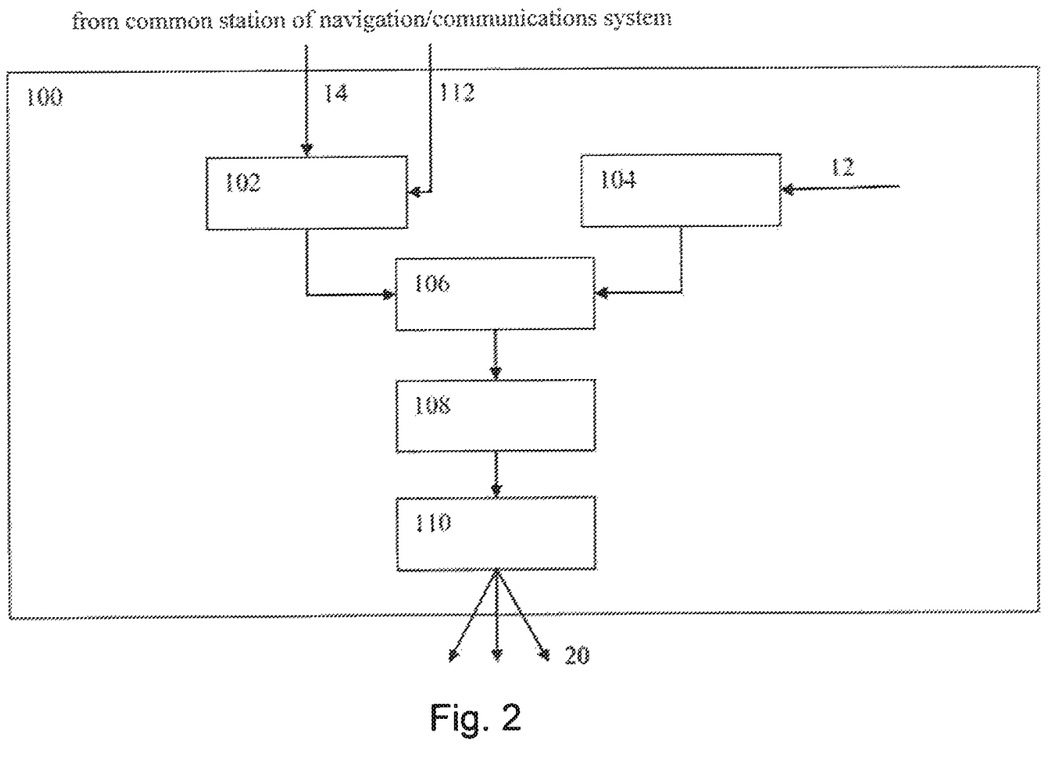
FIG. 2 shows a block diagram of an embodiment of a navigation or communication signal transmitter.

FIG. 2 shows a block diagram of a navigation or communication signal transmitter 100, which implements the principle shown in FIG. 1. The transmitter 100 comprises a receiver 102 for receiving data from a central station of the navigation or communication system such as the encoded common data 14 and an assignment scheme 112 determining the assignment of encoded common data 14 and encoded transmitter-dedicated data 16 to the frames of the frame structure 18. The transmitter-dedicated data 12 such as the transmitter status are encoded on-board of the transmitter 100 by means of an encoder 104 and are input to a frame assigner 106. The frame assigner 106 further receives from the receiver 102 the encoded common data 14 and the assignment scheme 112 received from the common station. The frame assigner 106 assigns the encoded common data 14 and the encoded transmitter-dedicated data 12 according to the assignment scheme 112 to first and second frames of the frame structure 18 and supplies the assignment and the encoded common data and transmitter-dedicated data to a signal assembler 108. The signal assembler 108 assembles a navigation or communication signal 20 conforming to the frame structure 18 and supplies the assembled navigation or communication signal 20 to a signal transmitter 110, which prepares the navigation or communication signal 20 for transmission, for instance encodes the signal 20 with a unique code, for example a PRN (Pseudo-Random-Noise) code (CDMA: Code Division Multiple Access), and disseminates the final navigation or communication signal 20 as broadcast signal for reception by navigation or communication signal receivers via RF (Radio Frequency).

Figure 3:
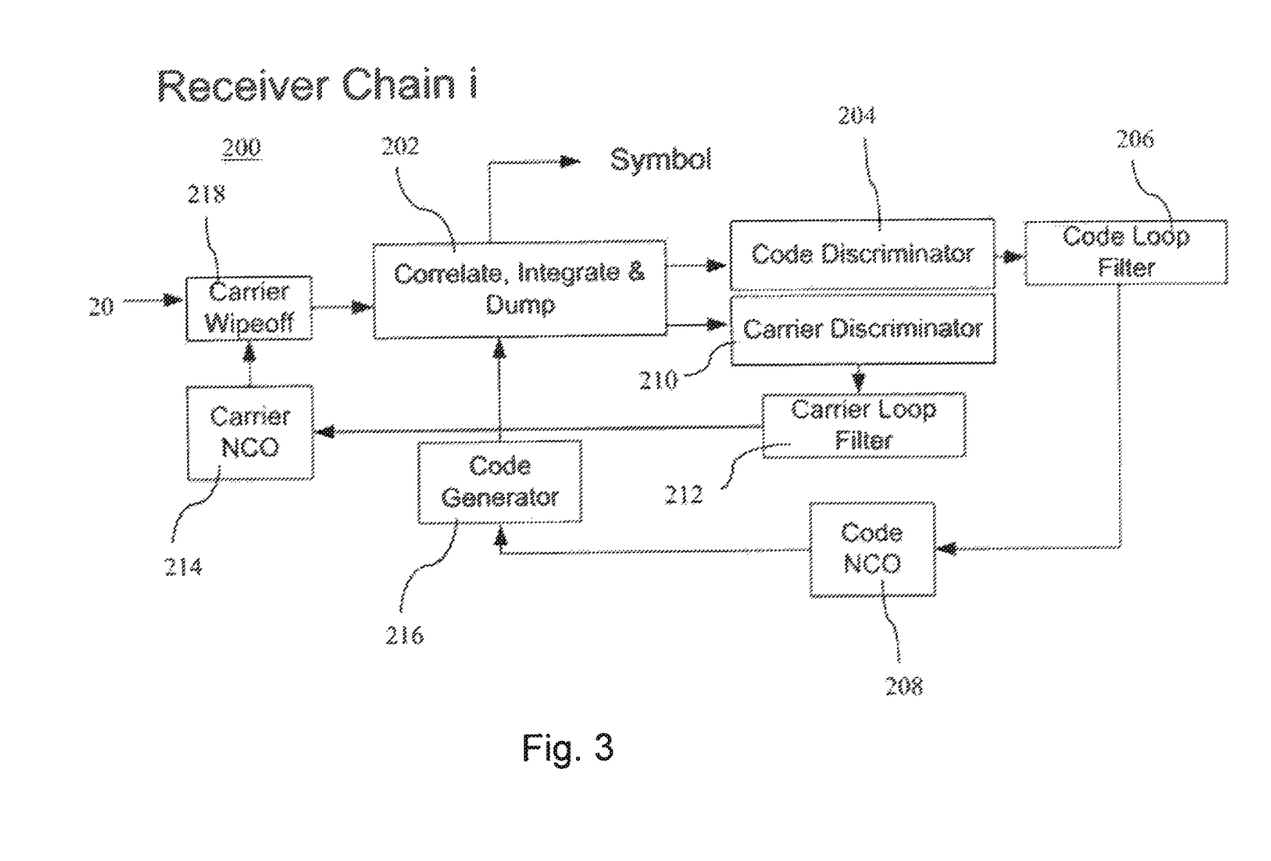
FIG. 3 shows a block diagram of an embodiment of a navigation signal receiver.

FIG. 3 shows a block diagram of a navigation signal receiver 200 for processing a received navigation signal 20 after down conversion in the baseband by a Carrier Wipe-off unit 218, wherein the processing stage includes a Correlation, integration & Dump unit 202, a DLL (Delay-Locked Loop) comprising a Code discriminator 204, a Code Loop filter 206, a Code NCO (Numerically Controlled Oscillator) 208, a PLL (Phase-Locked Loop) comprising a Carrier discriminator 210, a Carrier Loop filter 212, a Carrier NCO 214, and Code generator 216 controlled by the Code NCO 208. The symbols of the chain (i) are extracted after correlation, integration & Dump of the chain (i). Principally, the navigation signal receiver 200 can also be applied to a communication system as communication signal receiver.

Figure 4:
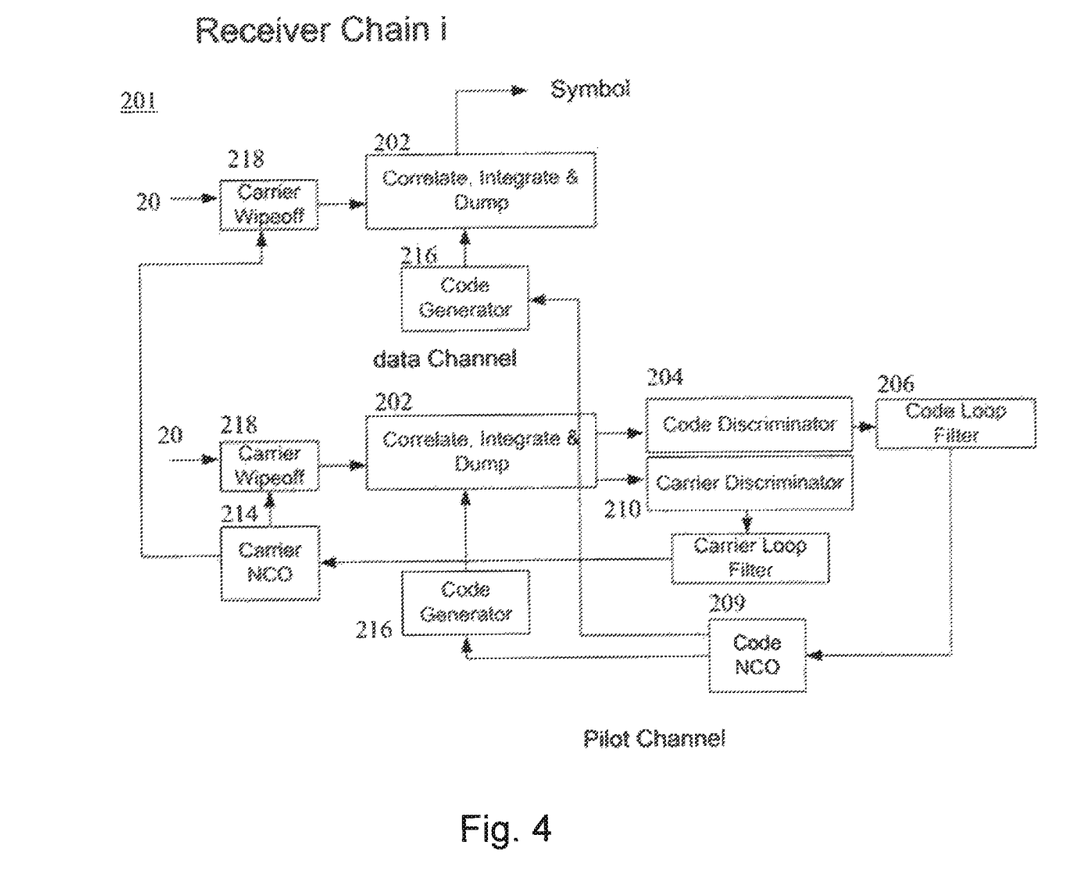
FIG. 4 shows a block diagram of an embodiment of a navigation signal receiver with pilot and data.

If there is a pilot channel, it can be used for the code and Doppler synchronization to support the data demodulation on the data channel. A block diagram of a navigation signal receiver 201 (pilot+data) is shown in FIG. 4. In contrast to the architecture shown in FIG. 3, a Code NCO 209 is applied with two outputs, one to control the Code Generator 216 of the Pilot Channel and the other one to control the Code Generator 216 of the Data Channel. The symbols of the chain (i) are extracted after correlation, integration & Dump of the data channel of chain (i).

The synchronization between the symbols received in the different chains is very accurate and less than a PRN chip.

Also, the receiver 201 can principally applied to a communication system, wherein the pilot channel can be for example used to transmit communication control data.

Figure 5:
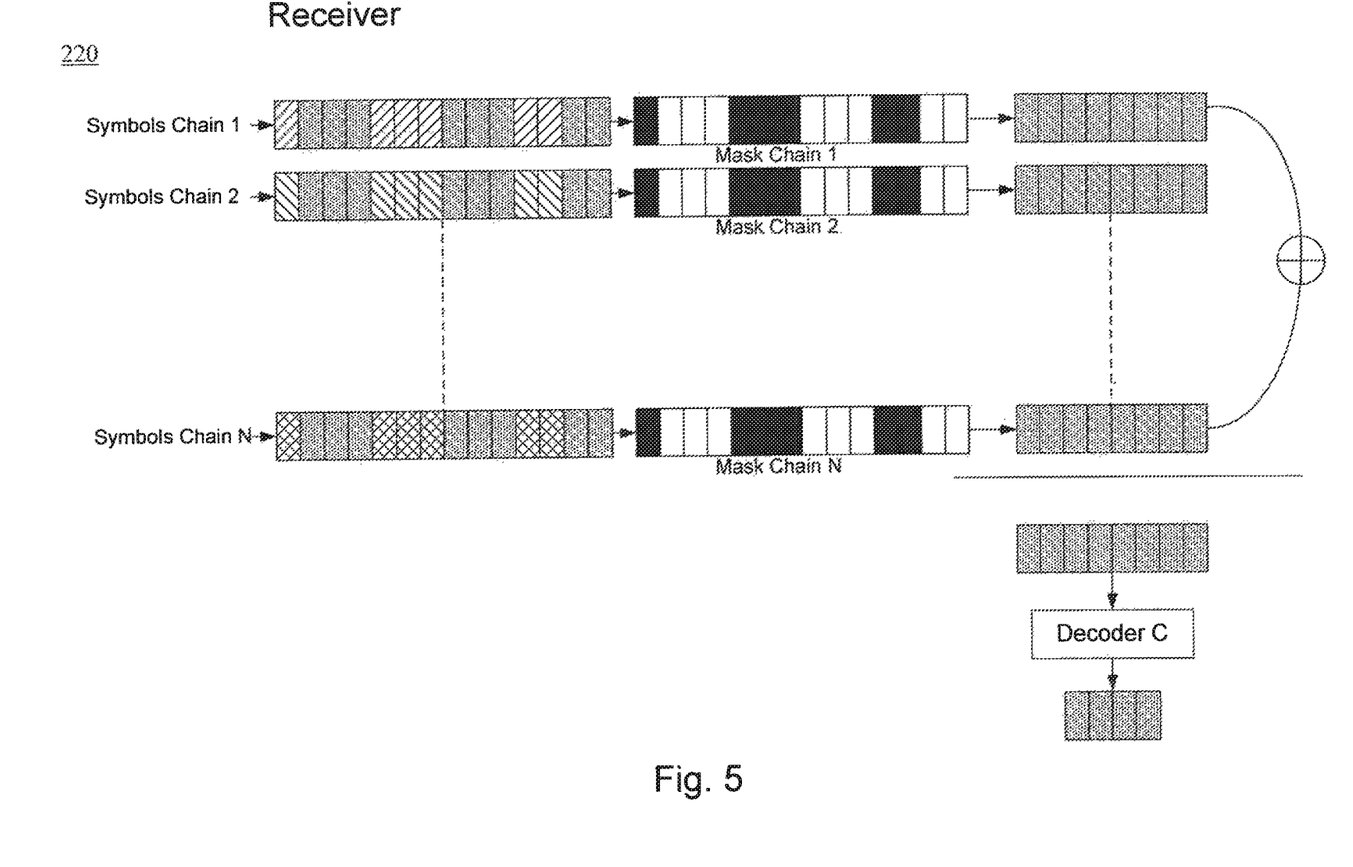
FIG. 5 shows the principle architecture of a system symbol processing unit on the receiver side according to the embodiment.

FIG. 5 shows the principle architecture of a common system symbol processing unit 220. The unit 220 applies for each symbols chain a first mask to extract the system symbols (containing the common data). A symbol chain contains the symbols received from a navigation or communication signal 20 disseminated by one of the transmitters 1 . . . N. Thus, if navigations or communication signals from N navigation or communication signal transmitters are received, N symbol chains are available for processing. The first mask depends on the assignment scheme applied in a transmitter of a navigation or communication signal. As described above, either a common assignment scheme or a transmitter dependent assignment scheme may be applied. Depending on the arrangement performed at transmitter side, i.e. the used assignment scheme, the first mask is either chain dependent or chain independent (i.e. identical for all chains). Once the system symbols of all chains are extracted, there are combined and then decoded with a decoder C in order to obtain the common data.

Figure 6:
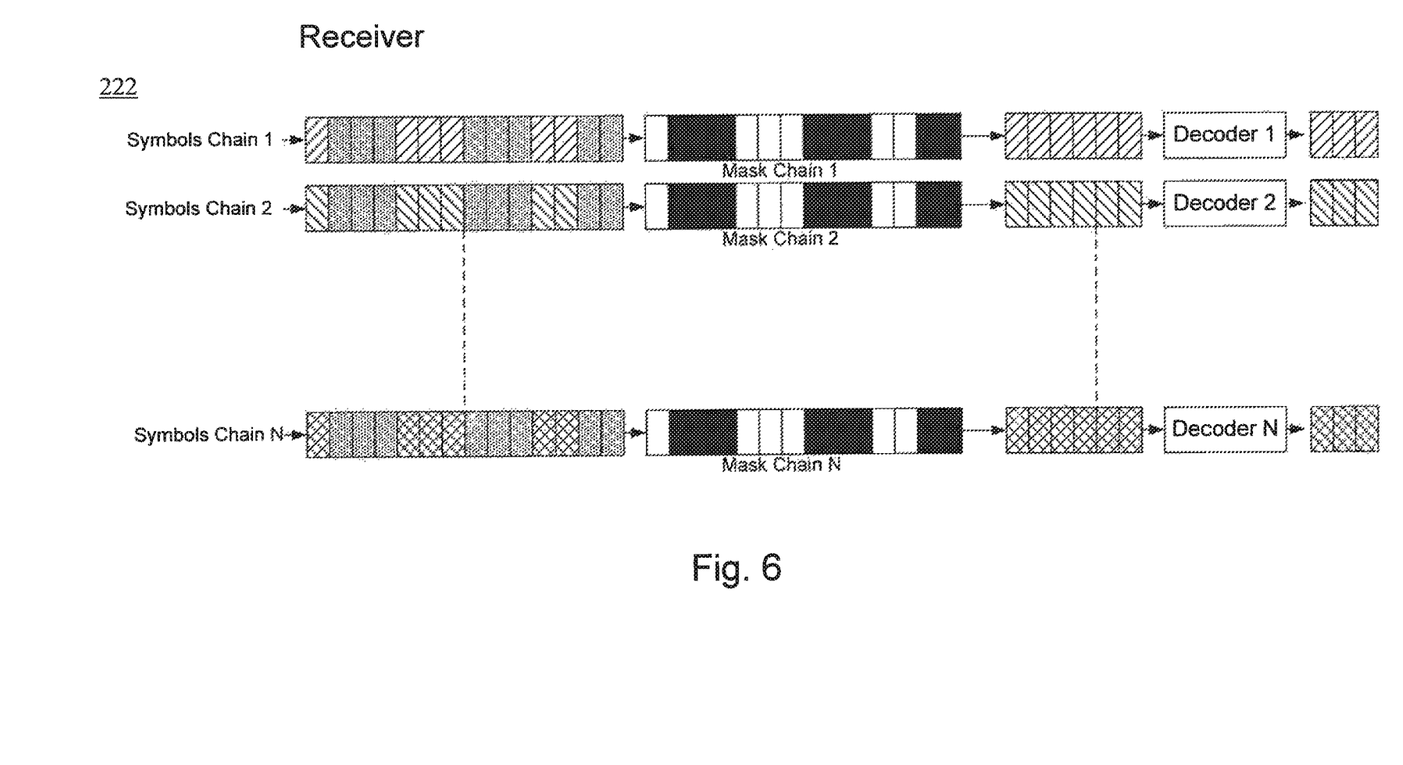
FIG. 6 shows the principle of a transmitter-dedicated symbol processing unit on the receiver side according to the embodiment.

FIG. 6 shows the principle architecture of a transmitter-dedicated symbol processing unit 222. The unit 222 applies for each symbols chain a second mask to extract the transmitter-dedicated symbols (containing the transmitter-dedicated data). The second mask is the inverse of the first mask. For each chain, the transmitter-dedicated symbols are then decoded by decoders 1 . . . N to obtain the transmitter-dedicated data.

The current embodiment proposes a way to handle the data at transmitter level in order to decrease the processing load of the transmitter. This solution provides a method to split transmitter-dedicated data, global system data and even local system data to be sent to the users.

The main advantage of this solution is the increase of performance w.r.t. BER, FER (Bit Error Rate, Frame Error Rate).

If the common data are received from four transmitters, the increase in terms of C/No (Carrier to Noise Density Ratio) is 6 dB.

Alternatively, the transmitter data rate can be increased by a factor equal to the number of transmitters (satellites or communication signal transmitters) in view that transmit the same common data without BER/FER degradation compared to the data dissemination method without diversity.

The proposed solution can be used in global/regional satellite navigation systems as Galileo or GPS or in communication systems, particularly digital communication systems using CDMA. This solution can also be very well suited for pseudolite-based indoor navigation systems as the environment in this case is often more stringent and broadcasted data are crucial in order to obtain the location of the transmitters.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the embodiment in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the embodiment as set forth in the appended claims and their legal equivalents.

What is claimed is:

1. A method for disseminating data in a navigation or communication system comprising several transmitters for signals, wherein a common frame structure is provided for the signals and each transmitter disseminates common data and transmitter-dedicated data through its broadcasted signal, and wherein the method comprises the following steps to be executed by each one of the transmitters:

receiving common data encoded with a first encoding scheme and an assignment scheme which determines an assignment of the encoded common data and encoded transmitter-dedicated data to frames of a frame structure;

encoding transmitter-dedicated data onboard the transmitter with a second encoding scheme;

assigning the encoded common data to a number of first frames of the frame structure provided for the signals and assigning the encoded transmitter-dedicated data to a number of second frames of the frame structure provided for the signals according to the assignment scheme, wherein the second frames differ from the first frames;

assembling a signal to be transmitted from the number of first and second frames; and transmitting the assembled signal.

2. The method of claim 1, wherein the common data encoded with a first encoding scheme are received from a common station of the navigation or communication system, which is configured to encode the common data with the first encoding scheme and to provide the encoded common data to the transmitters via uplink channels, and/or the common data are encoded with a first encoding scheme onboard of the transmitter by an encoder.

3. The method of claim 1, wherein the steps of frame assignation comprise one of:

applying a transmitter-dedicated assignment scheme; and applying a common assignment scheme independent from a specific transmitter.

4. A transmitter provided for disseminating a signal of a navigation or communication system, wherein a common frame structure is provided for the signal and the transmitter is configured to disseminate common data and transmitter-dedicated data with its signal, and wherein the transmitter comprises:

a receiver for receiving common data encoded with a first encoding scheme and an assignment scheme which determines an assignment of the encoded common data and encoded transmitter-dedicated data to frames of a frame structure;

an encoder for encoding transmitter-dedicated data with a second encoding scheme;

a frame assigner for assigning the encoded common data to a number of first frames of the frame structure provided for the signals and for assigning the encoded transmitter-dedicated data to a number of second frames of the frame structure provided for the signals according to the assignment scheme, wherein the second frames differ from the first frames;

a signal assembler for assembling a signal to be transmitted from the number of first and second frames; and a signal transmitter for transmitting the assembled signal.

5. The transmitter of claim 4, wherein the frame assigner is configured to perform the assignation according to an assignment scheme received from a common station of the navigation or communication system.

* * * * *